Oct. 9, 1945.　　　　　　J. M. ROPER　　　　　2,386,268
APPROACH LIGHT
Filed Jan. 18, 1938　　　　2 Sheets-Sheet 1
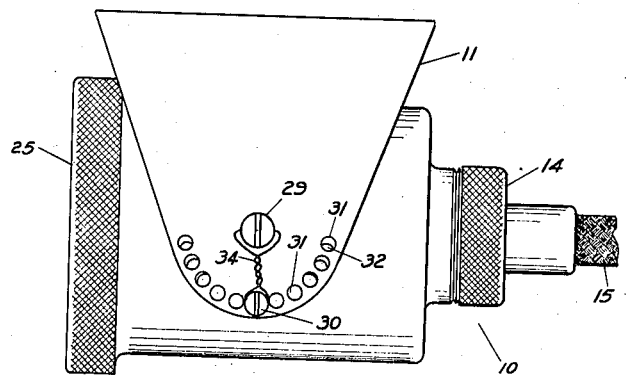
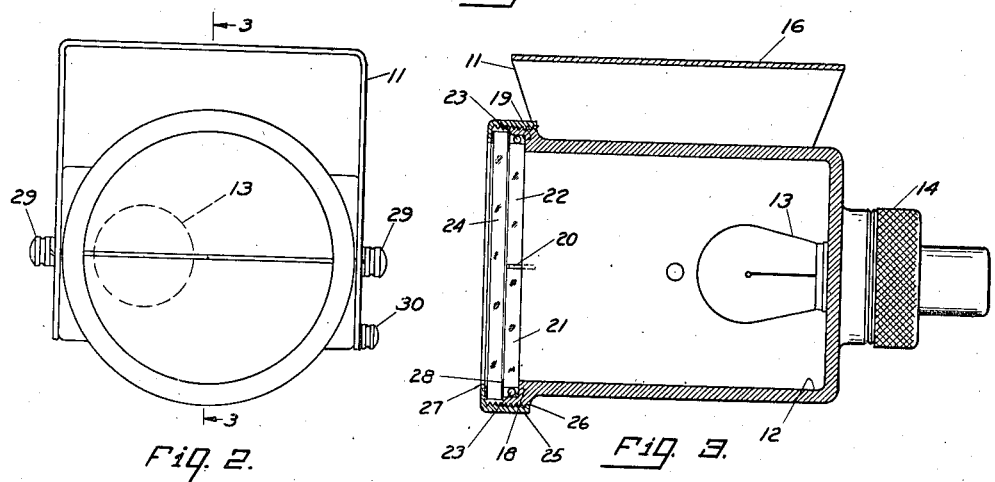
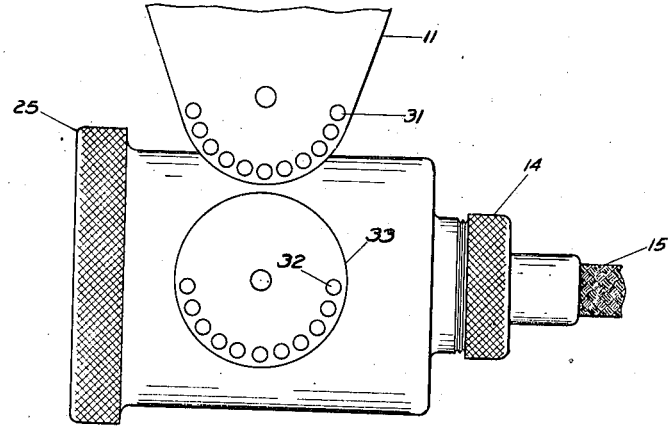
INVENTOR
JOHN M. ROPER
BY
*Ransom K. Davis*
ATTORNEY Oct. 9, 1945.  J. M. ROPER  2,386,268
APPROACH LIGHT
Filed Jan. 18, 1938   2 Sheets-Sheet 2

INVENTOR
JOHN M. ROPER.
BY
Ransom K. Davis
ATTORNEY

Patented Oct. 9, 1945

2,386,268

UNITED STATES PATENT OFFICE 2,386,268

APPROACH LIGHT

John M. Roper, Washington, D. C.

Application January 18, 1938, Serial No. 185,523

7 Claims. (Cl. 177—327)

(Granted under the act of March 3, 1883, as amended April 30, 1928; 370 O. G. 757)

This invention relates to an approach light, and has for an object to provide an approach light especially intended for use in connection with aircraft, the light being mounted preferably on the aircraft, but may likewise be mounted along the boundaries of a landing field and the approach edge of an aircraft carrier.

A further object of this invention is to provide an approach light which, by means of the color of the light visible therefrom, will indicate to the pilot, either directly or through intermediary of a signal man, whether he is approaching the landing field at the proper gliding angle and speed for a safe landing, or whether he is approaching at too great or too low an angle, so that he may guide himself accordingly, the light being so arranged that when conditions of speed and angle are proper for a safe landing, a white light is visible, and when conditions are unfavorable for a safe landing either a red or a green light will be visible so that the pilot may correct his speed and angle accordingly or defer the attempt to land.

With the foregoing and other objects in view, the invention consists in the construction, combination and arrangement of parts hereinafter described and illustrated in the drawings, in which:

Fig. 1 is a side elevational view of the approach light of this invention, including its angle mounting bracket;

Fig. 2 is a front elevational view of the light of Fig. 1;

Fig. 3 is a sectional view on line 3—3 of Fig. 2;

Fig. 4 is a side elevational partly exploded view of the light casing and the holding bracket;

Figure 6:
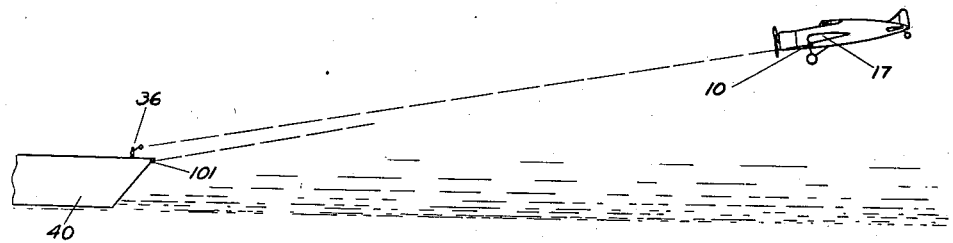
Fig. 6 is a schematic view of an aircraft and aircraft carrier utilizing this invention.
Figure 7:
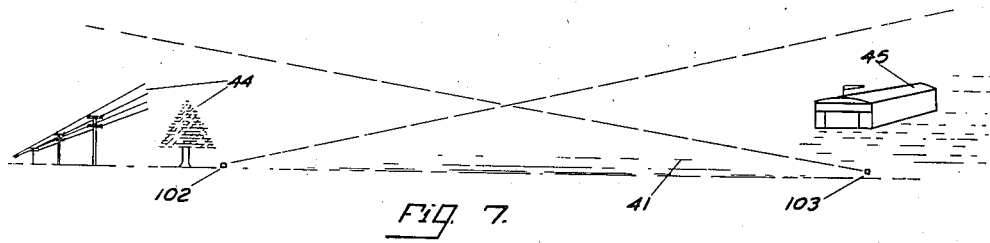
Fig. 7 is a schematic view of an application of this invention to a landing field.
Figure 5:
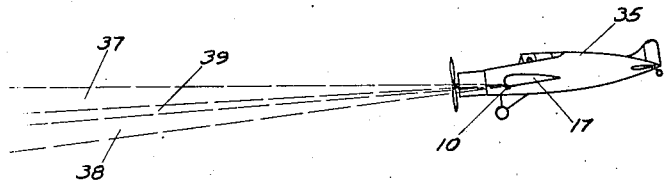
Fig. 5 is a schematic view of an aircraft to which this invention has been applied.

There is shown at 10 the approach light of this invention, which consists of a bracket 11 and a relatively long box-like housing 12 having a pre-focused lamp 13 accurately placed in the horizontal center line between the top and bottom of the housing and mounted in the socket 14 extending through the back of the housing, and provided with suitable electrical connection 15. The relatively long box-like housing 12, as shown, is cylindrical in cross-section, although it may equally well be rectangular in cross-section. The bracket 11 is intended to have its bight 16 suitably secured to the leading edge of an aircraft wing 17, it being intended that an approach light 10 be mounted on the leading edge of one or each aircraft wing on opposite sides of the fuselage of the aircraft, and the pre-focused lamp 13 be placed to one side or the other of the vertical center line of the housing 12, according to whether the lamp is to be used on the right or left of the fuselage, the one being shown on Fig. 2 being intended for use on the left of the pilot in the aircraft.

The inside opaque walls of the housing 12 are painted a non-reflecting black and the edge of the housing 12 is rabbeted as at 18 and 19, except for a spacing lug 20 accurately located in the horizontal center line and dividing the upper rabbeting 19 from the lower rabbeting 18. A green transparent member 21 in placed in the lower rabbeting 18 up to the spacing lug, and a red transparent member 22 is placed in the rabbeting 19 above the spacing lug 20, these members 21 and 22 being of glass or other suitable material, and their adjacent edges are spaced apart by the thickness of the spacing lug 20.

A shock absorbing filler member 23 may be placed within the rabbeting 18 and 19 to cushion the members 21 and 22. A transparent member 24 holds the transparent members 21 and 22 in proper position, the member 24 itself being held in position by a knurled flange nut 25 threaded over a threaded flange 26 within which the rabbetings 18 and 19 are located, shock absorbing washers 27 and 28 being provided to cushion the transparent member 24. The bracket 11 is intended to be fixedly mounted in position, but the housing 12 is adjustably mounted thereon by means of the pivot bolts 29 and the position fixing bolt 30 extending through a selected opening 31 in one arm of the bracket 11 and a selected opening 32 in a boss 33 fixed on the side of housing 12.

There are a plurality of openings 31 and 32 spaced in a circle centered about the openings for the bolt 29, eleven such openings being shown, although more or less may be provided as desired. The openings 31 are preferably 16° apart, while the openings 32 are 15° apart, and by bringing a selected opening 31 into alignment with a selected opening 32 adjustments of the housing to the bracket may be made up or down in variations of one degree. After position fixing bolt 30 is placed in position, a bolt locking wire 34 may be placed around the bolt 30 and its adjacent bolt 29. The angle of adjustment selected will depend upon the particular mounting position of the approach light 10 on the aircraft, as well as the preferred landing speed and landing angle therefor.

In operation the aircraft 35 carrying the approach light 10 will have a red light beam visible to a signalman or observer 36 only within the limits diagrammatically shown at 37. The green light beam will be visible only within the limits shown at 38, while a white light beam will be visible within the limits shown at 39.

When landing an aircraft its gliding speed will naturally be in a direct ratio to its gliding angle, and the housing is adjusted in the bracket with this in mind. If the aircraft 35 is approaching the landing area at the proper angle, an observer or signalman 36 within such area will see only a white light beam 39 from each of the right and left approach lights 10 on the right and left aircraft wings 17. Unless white light beams are visible from both right and left approach lights, it will mean that the aircraft is not pointed at the proper angle toward the observer, hence the aircraft is not coming in directly against the prevailing wind and it is not safe to land, for if the aircraft is not pointed at the proper angle to the observer, one or the other of the beams of light will be cut off, due to the fact that the lamp 13 is to one side of the vertical center line. If the aircraft is coming in too slowly, then the green beam 38 will be visible to the observer 36, and he will signal the pilot so that the pilot may act accordingly. If the aircraft is approaching too fast, the red beam 37 will be visible to the observer or signalman 36, and he will signal the pilot that his speed is too fast to permit him to land safely. The landing area may itself carry approach lights such as at 101 on the aircraft carrier 40. The color of the beam visible from the approach light 101 will indicate to the pilot whether he is going to land too short of the boundary of the aircraft carrier 40, or whether he is approaching at the proper speed for landing. Similarly, the landing field 41 may have approach lights 102 and 103 showing the several angles of approach to avoid obstructions 44 and 45 about the field.

Other modifications and changes in the proportions and changes in the proportions and arrangements of the parts may be made by those skilled in the art without departing from the nature of the invention, within the scope of what is hereinafter claimed.

The invention described herein may be manufactured and used by or for the Government of the United States of America for governmental purposes without the payment of any royalties thereon or therefor.

Having thus set forth and disclosed the nature of this invention, what is claimed is:

1. An aircraft approach light comprising a comparatively long boxlike housing having opaque side walls, a lamp mounted in an opaque end wall of said housing, said opaque walls being substantially non-reflecting, the opposite end wall of said housing being transparent, means for simultaneously, differently coloring individual beams of the light rays from said lamp passing through said transparent wall, each individual beam alone being visible within predetermined angles to said housing to the exclusion of the other individual beams, said coloring means comprising at least two differently colored transparent members mounted against said transparent wall, and means for slightly spacing apart the adjacent edges of said colored transparent members parallel and transversely of the horizontal axis of the light beam emitted by the lamp, whereby a substantially horizontal beam of light rays uncolored by said two differently colored transparent members may pass through said transparent wall within predetermined angles, said lamp being mounted away from the vertical center of said end wall, whereby light rays will spread further toward one side of the lamp housing than the other side.

2. An aircraft approach light comprising a comparatively long boxlike housing having opaque side walls, a lamp mounted in an opaque end wall of said housing, said opaque walls being substantially non-reflecting, the opposite end wall of said housing being transparent, means for simultaneously, differently coloring individual beams of the light rays from said lamp passing through said transparent wall, each individual beam alone being visible within predetermined angles to said housing to the exclusion of the other individual beams, said coloring means comprising at least two differently colored transparent members mounted against said transparent wall, and means for slightly spacing apart the adjacent edges of said colored transparent members parallel and transversely of the horizontal axis of the light beam emitted by the lamp, whereby a substantially horizontal beam of light rays uncolored by said two differently colored transparent members may pass through said transparent wall within predetermined angles.

3. An aircraft approach light comprising a comparatively long boxlike housing having opaque side walls, a lamp mounted in an opaque end wall of said housing, said opaque walls being substantially non-reflecting, the opposite end wall of said housing being transparent, means for simultaneously, differently coloring individual beams of the light rays from said lamp passing through said transparent wall, each individual beam alone being visible within predetermined angles to said housing to the exclusion of the other individual beams, said coloring means comprising at least two differently colored transparent members mounted against said transparent wall, means for slightly spacing apart the adjacent edges of said colored transparent members parallel and transversely of the horizontal axis of the light beam emitted by the lamp, whereby a substantially horizontal beam of light rays uncolored by said two differently colored transparent members may pass through said transparent wall within predetermined angles, and means for adjustably mounting said aircraft approach light on an aircraft whereby the particular individual light beam visible to an observer will indicate the angle at which the aircraft is approaching the observer.

4. An aircraft approach light comprising a comparatively long boxlike housing having opaque side walls, a lamp mounted in an opaque end wall of said housing, said opaque walls being substantially non-reflecting, the opposite end wall of said housing being transparent, means for simultaneously, differently coloring individual beams of the light rays from said lamp passing through said transparent wall, each individual beam alone being visible within predetermined angles to said housing to the exclusion of the other individual beams, said coloring means comprising at least two differently colored transparent members mounted against said transparent wall, means for slightly spacing apart the adjacent edges of said colored transparent members parallel and transversely of the horizontal axis of the light beam emitted by the lamp, whereby a substantially horizontal beam of light rays uncolored by said two differently colored transparent members may pass through said transparent wall within predetermined angles, and means for mounting said light on a landing area whereby the particular individual light beam visible to the aircraft pilot will indicate to the pilot his angle of position relative to the portion of the landing area at which said light is located.

5. An aircraft approach light comprising a comparatively long boxlike housing having opaque side walls, a lamp mounted in an opaque end wall of said housing, said opaque walls being substantially non-reflecting, the opposite end wall of said housing being transparent, means for simultaneously, differently coloring individual beams of the light rays from said lamp passing through said transparent wall, each individual beam alone being visible within predetermined angles to said housing to the exclusion of the other individual beams, said coloring means comprising at least two differently colored transparent members mounted against said transparent wall, and means for slightly spacing apart the adjacent edges of said colored transparent members parallel and transversely of the horizontal axis of the light beam emitted by the lamp, whereby a substantially horizontal beam of light rays uncolored by said two differently colored transparent members may pass through said transparent wall within predetermined angles, said spacing means being horizontally aligned within said housing relative to said lamp.

6. An aircraft approach light comprising a comparatively long boxlike housing having opaque side walls, a lamp mounted in an opaque end wall of said housing, said opaque walls being substantially non-reflecting, the opposite end wall of said housing being transparent, means for simultaneously, differently coloring individual beams of the light rays from said lamp passing through said transparent wall, each individual beam alone being visible within predetermined angles to said housing to the exclusion of the other individual beams, said coloring means comprising at least two differently colored transparent members mounted against said transparent wall, and means for slightly spacing apart the adjacent edges of said colored transparent members parallel and transversely of the horizontal axis of the light beam emitted by the lamp, whereby a substantially horizontal beam of light rays uncolored by said two differently colored transparent members may pass through said transparent wall within predetermined angles, said spacing means being horizontally aligned within said housing relative to said lamp, said lamp being mounted away from the vertical center of said end wall whereby light rays will spread further toward one side of the lamp housing than the other side.

7. An aircraft approach light comprising a comparatively long boxlike housing having opaque side walls, a lamp mounted in an opaque end wall of said housing, said opaque walls being substantially non-reflecting, the opposite end wall of said housing being transparent, means for simultaneously, differently coloring individual beams of the light rays from said lamp passing through said transparent wall, each individual beam alone being visible within predetermined angles to said housing to the exclusion of the other individual beams, said coloring means comprising at least two differently colored transparent members mounted against said transparent wall, means for slightly spacing apart the adjacent edges of said colored transparent members parallel and transversely of the horizontal axis of the light beam emitted by the lamp, whereby a substantially horizontal beam of light rays uncolored by said two differently colored transparent members may pass through said transparent wall within predetermined angles, said spacing means being horizontally aligned within said housing relative to said lamp, said lamp being mounted away from the vertical center of said end wall whereby light rays will spread further toward one side of the lamp housing than the other side, and means for adjustably mounting said aircraft approach light on an aircraft whereby the particular light beam visible from the approach light will indicate to the observer the angle at which the aircraft is approaching the observer.

JOHN M. ROPER.